United States Patent [19]

Palombi et al.

[11] 4,332,981
[45] Jun. 1, 1982

[54] CORDLESS TELEPHONE

[75] Inventors: Edward R. Palombi, 435 E. 65th St., New York, N.Y. 10020; Joseph H. Vogelman, 48 Green Dr., Roslyn, N.Y. 11576

[73] Assignees: Edward Rossi Palombi, New York; Joseph Herbert Vogelman, Roslyn, both of N.Y.

[21] Appl. No.: 178,358

[22] Filed: Aug. 15, 1980

[51] Int. Cl.³ .............................................. H04Q 7/04
[52] U.S. Cl. .................................................. 179/2 EA
[58] Field of Search ................. 179/2 E, 2 EA, 2 EB; 455/4, 68, 89

[56] References Cited

U.S. PATENT DOCUMENTS 3,586,787  6/1971  Vogelman et al. .............. 179/2 EA
4,053,717  10/1977  Snider .............................. 179/2 EA Primary Examiner—Joseph A. Popek
Attorney, Agent, or Firm—Hopgood, Calimafde, Kalil, Blaustein & Judlowe

[57] ABSTRACT

A cordless telephone system in which a communications path is established and maintained between a base and a remote unit with the transmission of a binary coded pulse train. Maintenance of the communications path in this manner does not require multiple carrier signals and avoids interference between adjacent remote units. A microphone switch is also provided that prevents accidental turn-on of the remote unit, thus preventing accidental battery depletion.

12 Claims, 5 Drawing Figures

CORDLESS TELEPHONE

FIELD OF THE INVENTION

This invention relates to communications systems and more particularly to a cordless telephone system employing the periodic transmission of a binary coded pulse train to establish and maintain a communications link between the base unit and the remote unit of the cordless telephone.

BACKGROUND OF THE INVENTION

Cordless telephone systems generally consist of a stationary base unit, connected to the telephone network, and a plurality of mobile remote units linked to the base unit by a communications highway, such as an FM radio link. Once communications have been established between the base and the remote, the user is able to operate the remote in the same manner as a conventional telephone.

The advantage of a cordless telephone system over a conventional telephone is of course the mobility of the remote unit. The radio link between base and remote allows the telephone subscriber to move anywhere within radio transmission range, rather than being restricted to the length of the standard telephone cord. Such mobility has substantial advantages over a conventional telephone, particularly in large home or office environments.

Due to the advantages inherent with a cordless telephone system there have been numerous prior art attempts to make such a system suitable for widespread application. Prior art cordless telephone systems are shown, for example, in U.S. Pat. Nos. 3,335,406; 3,644,681; 3,806,663 and 4,053,717. Notwithstanding these prior art attempts to produce a useful and practical cordless telephone, several problem areas remain.

Two important considerations in any cordless telephone system are establishing and maintaining the communications link between remote and base and conserving battery power at the remote unit. In a typical cordless telephone system the communications link is initiated by the remote user activating the remote unit, (by lifting the handset for example) which in turn, enables the transmission of a carrier signal to the stationary base unit. Reception of the carrier signal at the base unit activates a relay which serves to connect the base unit to the telephone network. In order to maintain the connection to the telephone network it is necessary to continuously transmit the carrier signal from the remote unit. Continuous transmission not only wastes power at the remote but, more importantly, severly limits the number and range of the remote units. That is, with a carrier transmission technique, each remote must transmit on a separate carrier frequency, resulting in expensive multiplication of receiver circuitry at the base. Alternatively, if a single carrier is used, the transmitter must have a very limited range so as to limit interference with adjacent remote units. Limiting the range of transmission destroys the cordless telephone's primary advantage, mobility, while multiple carrier signals make the base and remote expensive and impractical.

It is therefore an object of the present invention to provide a cordless telephone system which does not require the transmission of multiple carrier signals to maintain a communications link beteen base and remote units.

It is a further object of the present invention to provide a cordless telephone system which does not require limited range transmitters to prevent interference between cordless telephone units.

Conversation of battery power at the remote unit is also of primary importance. The use of battery power is, of course, necessary for remote unit mobility, but repeated battery changes are expensive and undesirable. Battery power is typically conserved by supplying power only to the radio receiver at the remote unit, when the remote unit is not being used, and supplying power to the remainder of the remote unit circuitry when the remote unit is activated. Although this basic approach is desirable for battery conservation, the manner in which a remote unit is generally activated, through use of an externally mounted switch, can lead to accidental remote unit activation and loss of battery power.

It is therefore another object of the present invention to prevent accidental activation of the remote unit and thereby prevent accidental loss of battery power.

SUMMARY OF THE INVENTION

In accordance with the invention, the remote unit, transmits periodic and repetitive control signals to the base unit. The base unit in response to the control signals, establishes and maintains a connection to the telephone network.

It is a feature of the invention that the control signal consists of a binary coded pulse train.

It is a further feature of the invention that each remote unit transmits a different binary coded pulse train which uniquely identifies the remote in operation.

It is another feature of the invention that the base unit, upon receipt of the preset binary coded pulse train from the remote unit, initiates transmission of a second preset binary coded pulse train to the remote unit.

It is a still further feature of the instant invention that the base unit will maintain the connection to the telephone network as long as transmission of the correct binary coded pulse train continues from the remote unit.

It is another feature of the instant invention that a portion of the remote unit circuitry is enabled by transmission of the second binary coded pulse train from the base unit and disabled when transmission ceases.

In accordance with another aspect of the invention the major portion of remote unit circuitry is normally disabled, and enabled only when the user activates the remote unit for operation.

It is a still further feature of the instant invention that the remote unit includes a retractable microphone, normally contained within the remote unit case and remote unit activation occurs only when the microphone is extended from the case.

The foregoing and other object of this invention will be more fully understood from the following description of an illustrative enbodiment thereof in conjunction with the accompanying drawings.

DETAILED DESCRIPTION

Figure 1:
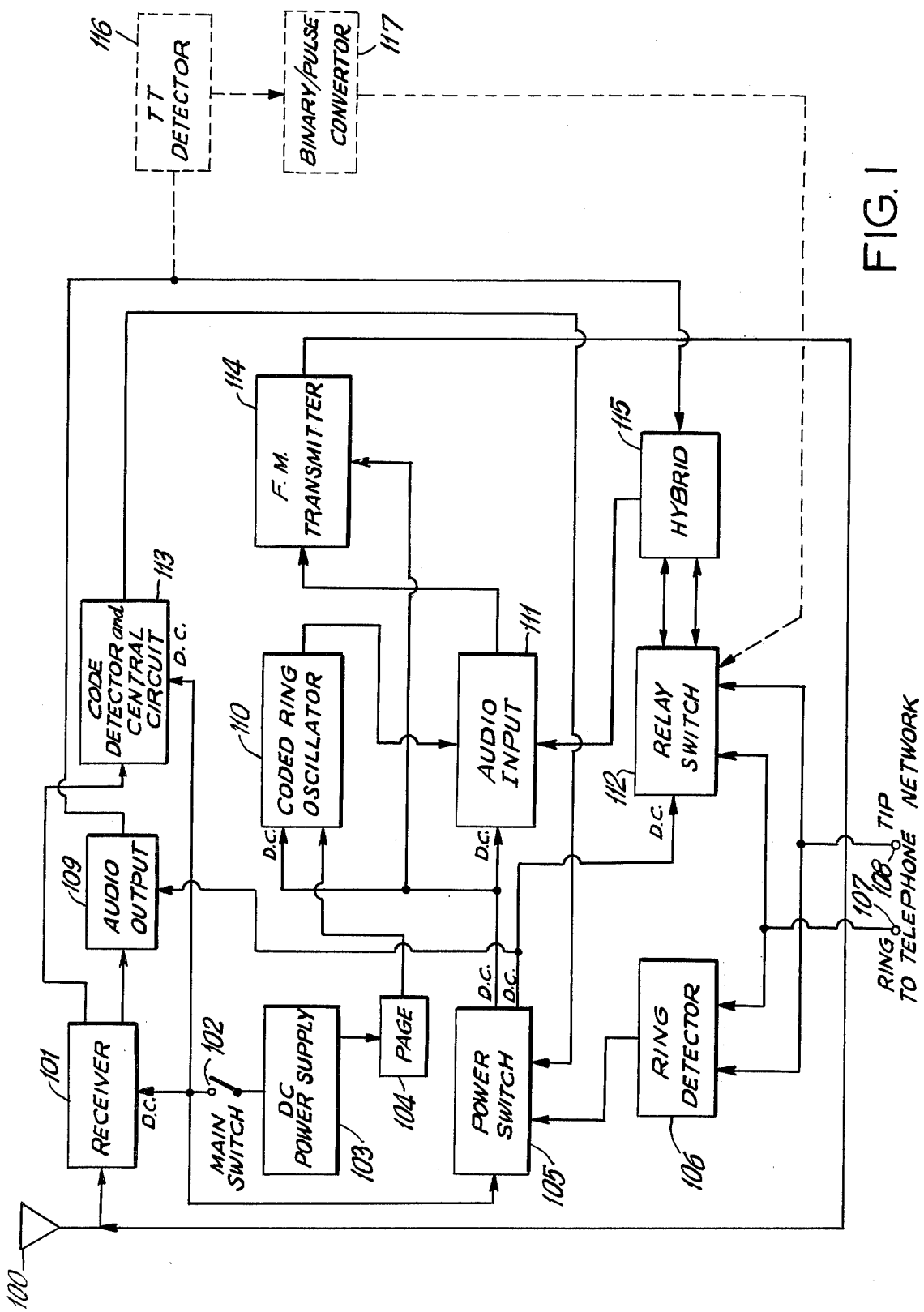
FIG. 1 discloses, in block diagram form, the base unit of the cordless telephone system.

The base unit of the instant invention, illustrated in FIG. 1, is permanently connected to the telephone network at tip and ring terminals 107 and 108, respectively. Power for the base unit is provided by DC power supply 103 which, when switch 102 is closed, supplies power to receiver 101, code detector and control circuit 113 and power switch 105. Power is not supplied to the remaining circuits in the base unit until an incoming or outgoing call is initiated as will be described hereinafter. Communication of voice and control signals between the base unit and the remote unit is provided by FM transmitter 114 and receiver 101. Transmitter 114 is a crystal controlled narrow band FM transmitter. Receiver 101 is a crystal controlled narrow band FM receiver.

Figure 2:
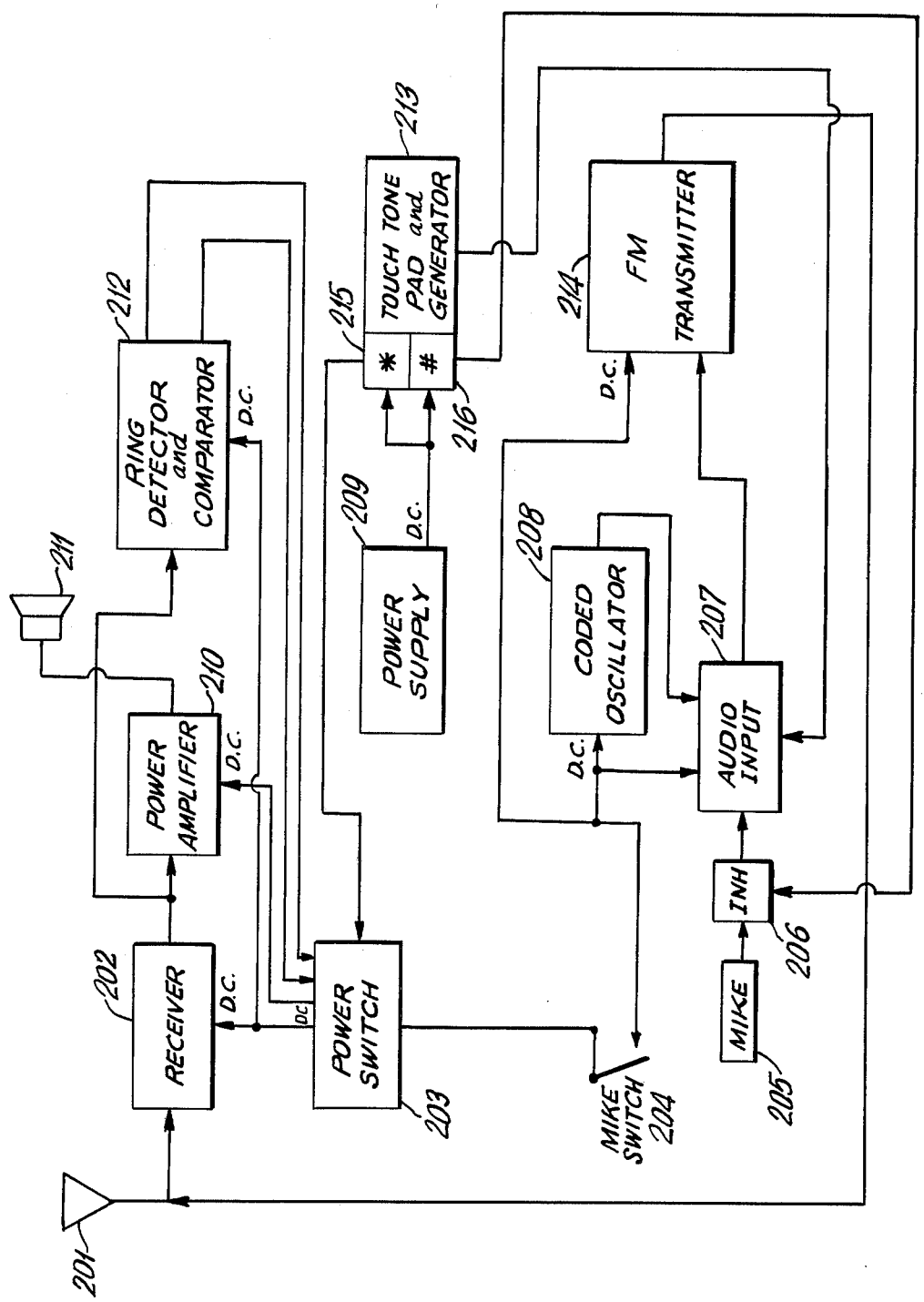
FIG. 2 discloses, in block diagram form, the remote unit of the cordless telephone system, and FIGS. 3A to 3C disclose a microphone switch in accordance with the instant invention.

The remote unit, illustrated in FIG. 2, is a small hand-held unit powered by DC power supply 209, preferably consisting of standard long-life dry cell batteries or rechargeable nickel-cadmium batteries. Communication of voice and control signals to the base unit is provided by crystal controlled narrow band FM transmitter 214 and crystal controlled narrow band receiver 202. Dialing is provided by a standard Touch-Tone pad and generator 213 which includes the "*" and "#" keys 215 and 216.

Depression of "*" key 215 places the remote unit in the standby mode. In this mode power is applied to power switch 203, which in turn applies power to receiver 202 and ring detector and comparator 212. Battery power is conserved in the standby mode by applying power to the receiver and ring detector for 40 milliseconds and removing power for 1800 milliseconds. Application of power to the remaining circuits in the remote unit will be described hereinafter. Depression of key 215 a second time turns all circuits off. Power switch 203 is preferably a transistorized switch capable of applying power to the various remote unit components in response to control signals. The design of such a switch is well known and will not be further described.

Operation of the cordless telephone in accordance with the instant invention will now be described commencing with a description of incoming calls and followed by a description of outgoing calls.

Incoming Calls

Referring to FIG. 1, an incoming ringing signal from the telephone network, signifying the presence of an incoming call, is applied to tip and ring terminals 108 and 107, respectively, and from there to ring detector 106, a standard telephone system ring detector. The existence of a ringing signal of over 50 volts AC at 20 Hz applied to the ring detector results in a control signal being applied to power switch 105. The power switch, in response to the control signal from the ring detector, applied DC power to coded ring oscillator 110, audio input unit 111 and FM transmitter 114 for the duration of the ring signal. Power switch 105 is preferably a transistorized switch capable of applying power to the various base unit components in response to control signals. The design of such a switch is well known and will not be further described.

Application of power to coded ring oscillator 110 causes the oscillator to produce a 1,470 hertz tone modulated by a coded pulse train. The pulse train consists of a clock or start pulse followed by three code pulses. The code pulses are preselected by switches (not shown) to produce a one out of seven code. Oscillator 110 is a standard audio oscillator. The use of switches to produce a one out of seven code and techniques for modulating an audio signal with such a code are well known. Therefore the circuitry will not be further described. The coded transmission produced by oscillator 110 is repeated at least 10 times per second for the duration of the ringing signal.

The coded pulse train output of the ring oscillator, is applied to audio input unit 111 and from there to FM transmitter 114. Audio input unit 111 consists of a pre-emphasis network and automatic level control amplifier and is designed to accept the code from oscillator 110 and, in response thereto, cause transmitter 114 to produce a peak to peak deviation of the RF carrier frequency of 3.0 KHz for a binary "1" code and a 1.5 KHz for a binary "0" code. The binary modulated signals from FM transmitter 114 is transmitted to the remote unit via antenna 100.

Referring to FIG. 2, the remote unit is normally in a standby condition, awaiting the transmission of a ringing signal from the base unit. As previously described, receiver module 202 and ring detector 212 are normally on for 40 milliseconds and off for 1,800 milliseconds. Whenever the 1,470 hertz tone from the base unit is detected, by ring detector 212, for a period greater than 10 milliseconds a control signal is generated and applied to power switch 203 via lead 217. Application of the control signal to power switch 203 results in DC power being applied to receiver 202 and ring detector 212 for six continuous seconds.

Receiver 202, now activated, receives the incoming code, demodulates it and applies the code to the comparator portion of ring detector and comparator 212. If the incoming code generated by coded ring oscillator 110 (FIG. 1) matches a preset code in comparator 212 a second control signal is generated and applied to power switch 203 via path 218. In response to this second control signal power switch 203 applies DC power to power amplifier 210. Amplifier 210, now activated, receives the demodulated 1,470 hertz signal from receiver 202, amplifies the signal and applies the amplified signal to speaker 211. This tone alerts the user that the particular remote unit in his possession is being signaled for an incoming call. Although the circuitry of ring detector and comparator 212 has not been described in detail it is apparent to one skilled in the art that the ring detector portion would consist of an active band pass filter tuned to 1470 Hz and a circuit to determine when a 1470 Hz signal is applied to the filter. Similarly the comparator portion would include switches (not shown) preset to the same binary code being transmitted by the base unit and a simple digital logic circuit to compare the incoming binary code with the preset code. Such comparators are well known.

When alerted that a call is incoming the user extends a microphone (not shown) on the remote unit closing microphone switch 204. The details of the microphone switch will be described hereinafter. Closing switch 204 applies DC power from power switch 203 to all of the remaining components in the remote unit, i.e., coded oscillator 208, audio input unit 207 and FM transmitter 214.

Application of DC power to coded oscillator 208 causes the oscillator to produce a low-frequency sub-carrier signal in the range of 25 to 75 hertz which is continuously modulated by a coded pulse train, similar to the pulse train generated by oscillator 110 (FIG. 1). The code generated by oscillator 208 is also set by a plurality of switches (not shown) in the same manner as the code is set for oscillator 110. The code used for both oscillator 110 and oscillator 208 is identical except as to duration and repetition rate. Coded oscillator 208 produces the preset code continuously at a rate not less than 1 code train per second during the entire interval that the microphone switch is activated, i.e., as long as the microphone is in the extended position. The output of coded oscillator 208 is applied to audio input unit 207, and from there to FM transmitter 214. The output of oscillator 208 is adjusted so that the R.F. carrier deviation of the FM transmitter, when no other signals are present, is 1.5 KHz. Audo input unit 207 includes an active band pass filter to insure that all components of the oscillator output above 300 Hz are at least 50 db down when this signal is later combined with the voice signal from the microphone, described hereinafter. Unit 207 also includes a summing amplifier for amplifying and combining the microphone output signal and the output signal from oscillator 208. The output from transmitter 214 is broadcast to the base unit via antenna 201.

Referring again to FIG. 1, the coded signal broadcast by remote transmitter 214 is received at the base unit and demodulated by receiver 101. The demodulated code is applied to code detector and control circuit 113, and when the received code from the remote unit matches a preset code in the code detector a control signal is generated by the code detector which is applied to power switch 105. The code is preset into detector 113 in the same manner the code is preset into comparator 212 (FIG. 2). Application of this control signal to power switch 105 serves to apply DC power to all remaining components in the base unit, with the exception of oscillator 110, which is turned off. Code detector and control circuit 113 includes a 10 second timing circuit which is initially activated and then continuously reset each time a correct code comparison is made between the code broadcast by the remote unit and the preset code stored in detector 113. When transmission from the remote unit terminates the 10 second timer times out and disables the control signal applied to power switch 105. Power is then removed from the base unit circuits.

Application of power to relay switch 112 closes dual relay contacts (not shown) which connect the tip and ring lines from the telephone network to hybrid circuitry 115 and from there to the audio input unit 111. Hybrid circuitry 115 is a standard impedance matching network well known in the telephone art. Hybrid circuitry 115 is also connected to the audio output circuit 109 as shown.

A communications path has now been established between the base and remote units by the transmission of the binary coded pulse train from the remote unit to the base unit. The remote unit continues to broadcast its preset code at a rate not less than one code train per second and as long as this transmission continues power is applied to the base unit components. This maintains the communications path between the remote unit and the base unit and maintains the connection to the telephone network. Maintenance of the communications path in this manner provides advantages over prior systems in that multiple carrier signals are not needed and transmitter range need not be limited as each remote is uniquely identified by a predetermined binary code.

With the communications link established between the remote unit and the base unit, it is now possible for the remote user to communicate over the telephone network. Incoming voice signals from the telephone network are transmitted through hybrid network 115 and from there to the audio input 111 in the base unit. The voice signals are amplified and pre-emphasized by unit 111 so as to increase the transfer function gain of the network versus frequency and thereby provide signal conditioning for translating narrow band FM transmitter 114 to a near phase modulated transmitter. Unit 111 also provides automatic level control such that the maximum deviation of 2500 Hz is 8 KHz peak-to-peak. The audio amplifier in unit 111 has a roll-off at the rate of 6 db per octave about 2500 Hz with a second cutoff as at 4,000 Hz to minimize noise transmission to the remote unit. The dynamic range of the automatic level control is preferably at least 40 db. The voice signals modulate the FM carrier and are broadcast via transmitter 114 and antenna 100 to the remote unit. The voice signals are received, demodulated, applied to power amplifier 210, and from there to speaker 211.

Voice signals from the remote user are detected by microphone 205, applied to inhibit unit 206 (to be described hereinafter) from there to audio unit 207 and from there to FM transmitter 214. The speech of the remote user is then broadcast via antenna 201 to base unit 100, demodulated by receiver 101 and applied to the audio output unit 109. The speech signals are then amplified, applied to hybrid 115 and applied from there to the telephone network via tip and ring terminals 107 and 108. It is to be understood that audio input unit 207 in FIG. 2 combines the audio input from microphone 205 with the coded oscillator output 208 for transmission as described above. The audio signals are demodulated and applied to audio output unit 109 while the coded signals are applied to code detector 113.

At the completion of the call, the remote user "hangs up" by replacing the microphone within the remote unit case. Replacing the microphone within the case opens microphone switch 204 which in turn disables coded oscillator 208. Oscillator 208 ceases transmission, but code detector 113 will maintain power to the base unit for 10 additional seconds as previously described. At the end of 10 seconds, the control signal from detector 113 is removed from power switch 105, removing power from all base unit components except for receiving 101 and code detection circuitry 113. Relay 112 is also disabled, disconnecting the base unit from the telephone lines.

Outgoing Calls

To initiate an outgoing call a user activates the remote unit shown in FIG. 2 by extending the microphone arm, as will be detailed hereinafter. Extension of the microphone arm places switch 204 in the closed position, applying power from power switch 203 to oscillator 208. Application of power to oscillator 208 causes the generation of the preset code, previously described, which is applied to audio input unit 207 and from there to FM transmitter 214. The coded FM signal is broadcast to the base unit, received at receiver 101, demodulated and applied to code detector 113. When the code matches as previously described, power is supplied to the base components causing the operation of relay switch 112, connecting the base unit to the telephone network. This causes the base unit to go "off hook", dial tone is received from the telephone network, applied to the hybrid unit 115, to audio input unit 111 and from there to FM transmitter 114. Dial tone is broadcast to the remote unit, received, demodulated as previously described and applied to speaker 211.

Upon receipt of dial tone the remote user activates the Touch Tone keyboard and generator by depressing the "#" key on the keyboard. Depressing the "#" key applies power from power switch 203 to the Touch Tone generator, disables the microphone output with inhibit switch 206 and connects the output of the Touch Tone generator to audio input unit 207.

The remote user may now depress any of the numbered keys on the Touch Tone pad causing the standard telephone system 2 out of 8 tones to be transmitted to the base station. These tones are applied to audio input unit 207 and from there to FM transmitter 214 which sends the tones to the base unit and the telephone network as previously described. After dialing the desired number, the "#" key is depressed a second time which disconnects the Touch Tone generator and re-enables the microphone output via inhibit switch 206. Upon receipt of the Touch Tone signals at the telephone network and connection to the called party, communications continue between the remote unit and the telephone network in the manner previously described.

For use in non-Touch Tone systems an optional Touch Tone detector 116 and binary pulse converter 117 are utilized. In this system the Touch Tone signals transmitted by the remote unit are applied to detector 116, converted to a binary code and applied to converter 117. Converter 117 converts the binary code to the standard telephone dial-pulse format which is in turn applied to the telephone network switch 112 and tip and ring terminals 107 and 108.

An optional feature for the base system is a paging unit. A pushbutton momentary switch 104 is provided at the base station and when this switch is depressed voltage is applied to the oscillator 110. The voltage activates the oscillator in the manner described above and causes the ringing tone, 1,470 hertz, to be transmitted to the remote unit. This signal is decoded and applied to speaker 211 as described above, and alerts the remote user that he is being paged from the base unit.

Figure 3A:
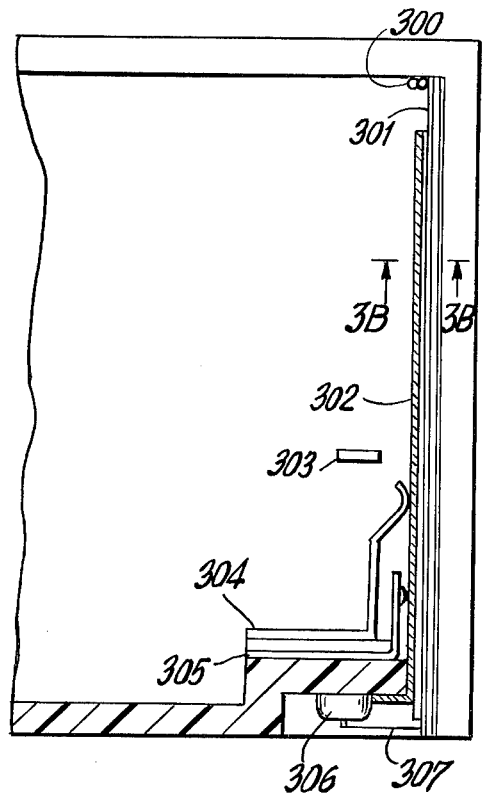
Figure 3B:
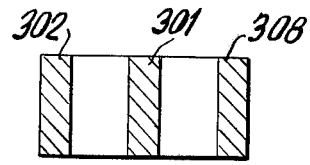
Figure 3C:
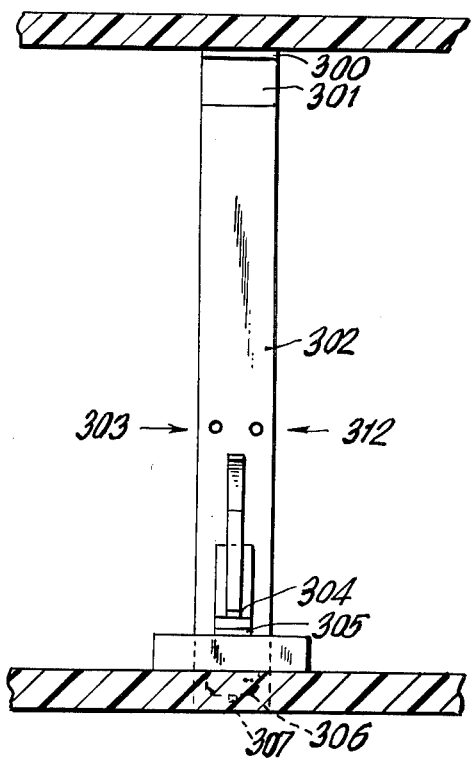

Referring now to FIGS. 3A through 3C a description will be given of the operation of the microphone switch. When microphone 306 is in a retracted position, within the case of the remote unit as shown, the microphone input is grounded through the left conducting layer 302 of a triple layer circuit board shown in FIG. 3B. Grounding is accomplished through ground terminal 305 which grounds the microphone input to circuit ground in the case unit.

When the microphone assembly is extended, downward to FIG. 3A, terminals 304 and 305 slide along circuit board portion 302. When the microphone is fully extended terminal 304 makes contact with circuit board portion 301 shown in FIGS. 3A and 3B and connects microphone 306 via microphone wire 307 and circuit board portion 301 to the microphone input. In this extended position terminal 300 serves to connect DC power to the remote components illustrated in FIG. 2 (microphone switch 204) by making a connection between DC input power supply terminal 303 and the right most portion of the circuit board layer 308 shown in FIGS. 3A and 3B. FIG. 3C is a side view of FIG. 3A, and further illustrates the manner in which DC power terminal 303 is connected to power supply terminal 312 by circuit board portion 300 in the manner just described.

Although a specific embodiment of this invention has been shown and described it will be understood that various modifications may be made without departing from the spirit or scope of this invention.

I claim:

1. A cordless telephone system, comprising
a base unit, said base unit comprising means for receiving ringing signals from a telephone network, means responsive to the reception of said ringing signals for enabling a first binary code generator and for transmitting a first binary code generated by said first generator to a remote unit,
said remote unit comprising means for receiving said first binary code, means responsive to the reception of said first binary code for enabling a second binary code generator and for continuously transmitting a second binary code generated by said second binary code generator to said base unit, and
means included in said base unit and responsive to the reception of said second binary code for providing an audio signaling path between said remote unit and said telephone network, said providing means including means responsive to the termination of said second binary code transmission for breaking said audio signaling path.

2. A cordless telephone system in accordance with claim 1, wherein said base unit further includes means responsive to the reception of said second binary code for disabling said first binary code generator.

3. A cordless telephone system in accordance with claim 1, wherein said first binary code generator comprises an audio oscillator, switch means for selecting a first one out of n binary code, and means for modulating an audio signal generated by said audio oscillator with said first one out of n binary code.

4. A cordless telephone system in accordance with claim 3, wherein said transmitting means includes an FM transmitter, said FM transmitter broadcasting said modulated audio signal to an FM receiver included in said remote unit.

5. A cordless telephone system in accordance with claim 4, wherein said remote unit includes means for demodulating said modulated audio signal received by said FM receiver, means for comparing said first one out of n code from said demodulated audio signal with a second one out of n code stored in said remote unit, and means responsive to a valid comparison between said first and second one out of n codes for applying power to said second binary code generator.

6. A cordless telephone system in accordance with claim 1, wherein said remote unit further includes means for periodically applying power to selected portions of said remote unit, and means included in said enabling means and responsive to the reception of said first binary code for continuously applying power to selected portions of said remote unit.

7. A cordless telephone system, comprising a remote unit, said remote unit comprising means for generating a first binary code uniquely identifying said remote unit, microphone means for receiving voice signals from a remote unit user, means for modulating a low-frequency subcarrier signal with said first binary code, means for generating telephone system switching signals, and means for selectively combining said first binary code-modulated subcarrier signal, said voice signals and said switching signals and for transmitting said combined signals to a base unit, said base unit comprising, means for receiving said combined signals from said remote unit, means responsive to the reception of said first binary code for establishing a signaling path between said remote unit and a telephone network, said signaling path carrying said voice signals and said switching signals to said telephone network, and means responsive to the termination of said first binary code transmission for breaking said signaling path.

8. A cordless telephone system in accordance with claim 7, wherein said establishing means includes means for comparing said first binary code with a second binary code stored in said base unit, and means responsive to a valid comparison between said first and second binary codes for connecting said base unit to said telephone network.

9. A cordless telephone system in accordance with claim 8, wherein said base unit further includes means responsive to said valid comparison between said first and second binary codes for applying power to selected portions of said base unit.

10. A cordless telephone system, comprising:

a base unit, said base unit comprising means for receiving audio signals and ringing signals from a telephone network and means for transmitting said audio signals and said ringing signals to a remote unit, said remote unit comprising means responsive to the reception of ringing signals from said base unit for alerting a remote unit user, switch means operable by said remote unit user for applying power to a portion of said remote unit, said switch means applying power to said portion when a microphone, included in said remote unit, is slidably extended from said remote unit by said remote user, and means responsive to the application of power to said portion for receiving said audio signals transmitted from said base unit.

11. A cordless telephone system in accordance with claim 10, wherein said remote unit further includes means for transmitting a binary code to said base unit, said binary code uniquely identifying said remote unit.

12. A cordless telephone system in accordance with claim 11, wherein said base unit further includes means responsive to the transmission of said binary code from said remote unit for maintaining a signaling path between said remote unit and said telephone network.

* * * * *